Nov. 6, 1951     H. L. BOWDITCH     2,573,950
INDICATOR FOR RECORDING INSTRUMENT
Filed Jan. 9, 1948     2 SHEETS—SHEET 1
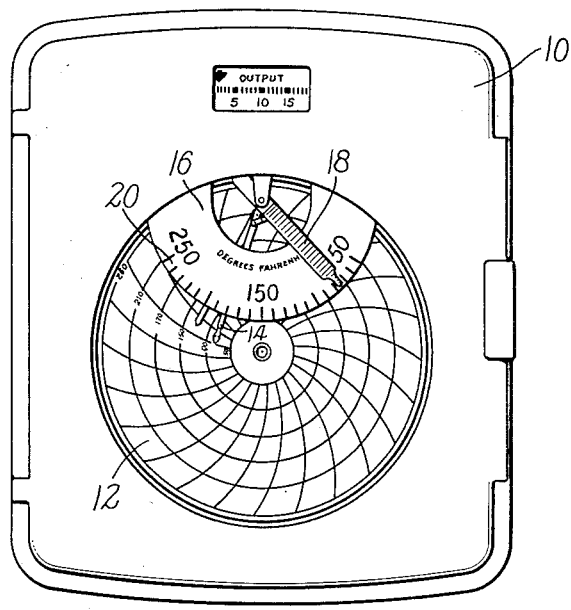
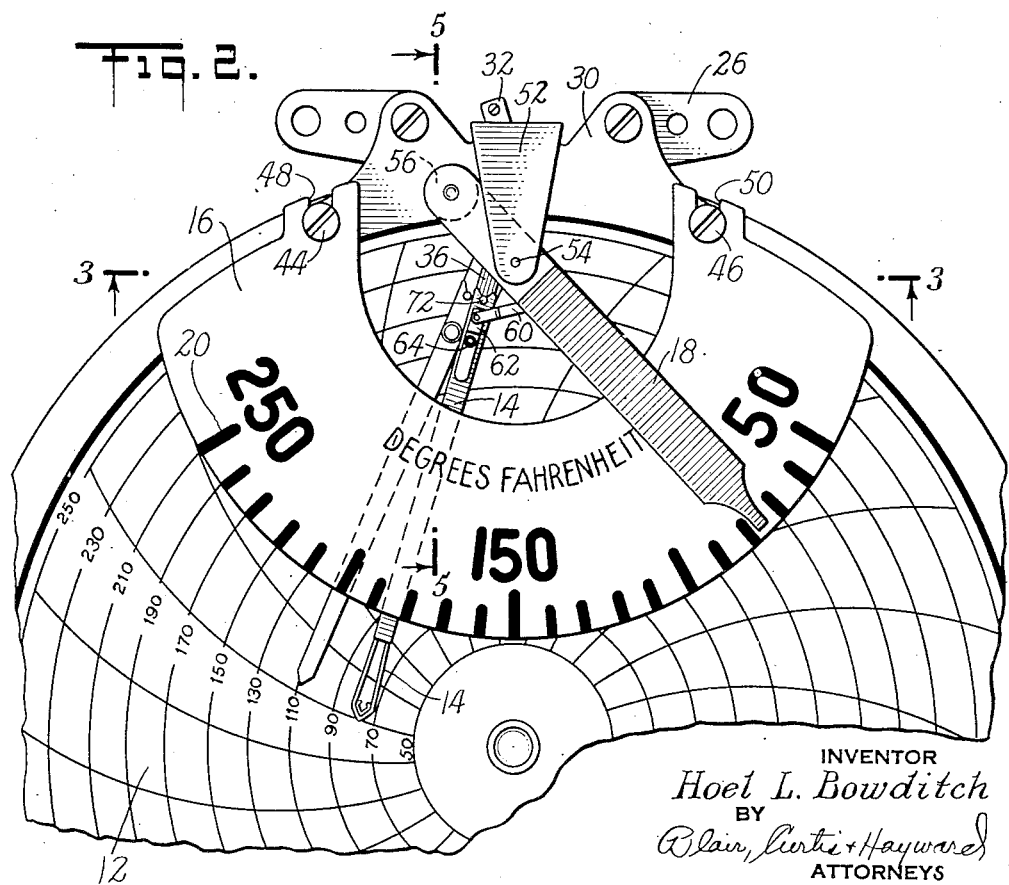
INVENTOR
Hoel L. Bowditch
BY
Blair, Curtis & Hayward
ATTORNEYS Nov. 6, 1951     H. L. BOWDITCH     2,573,950
INDICATOR FOR RECORDING INSTRUMENT
Filed Jan. 9, 1948     2 SHEETS—SHEET 2
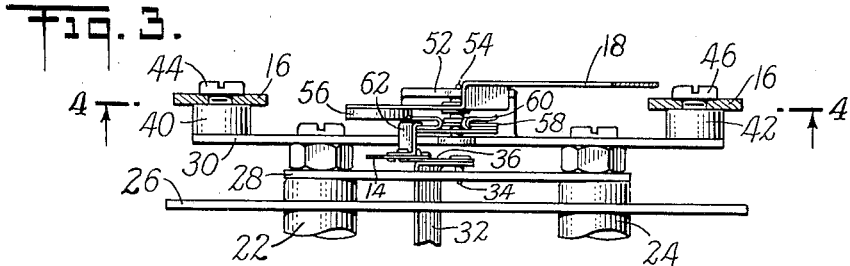
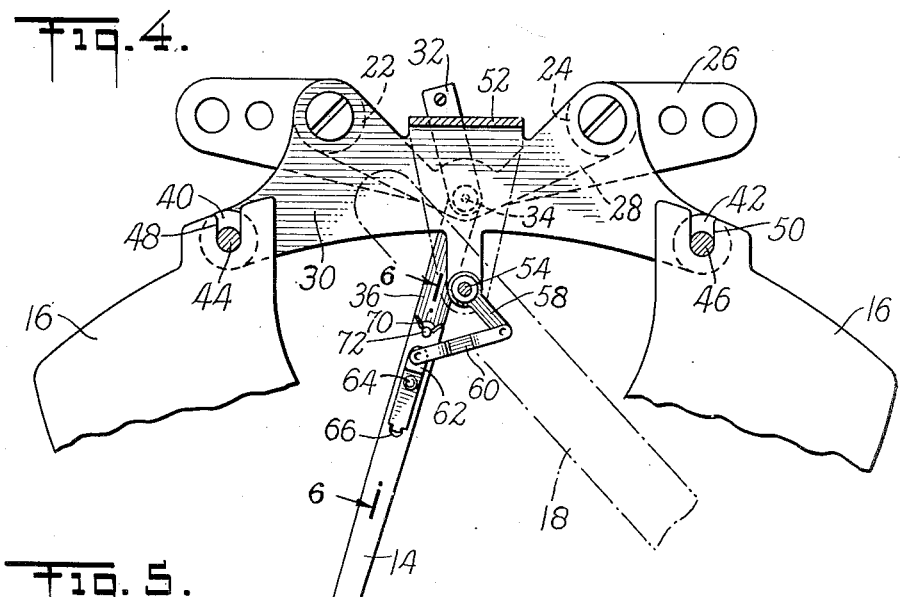
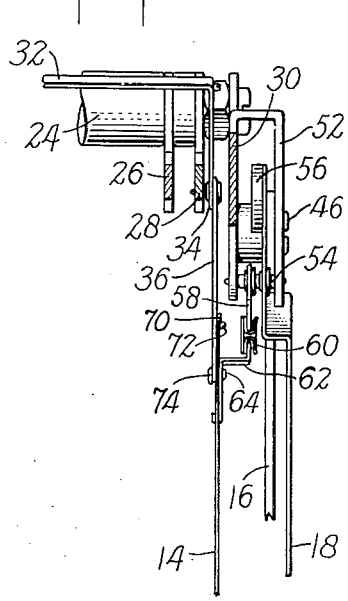
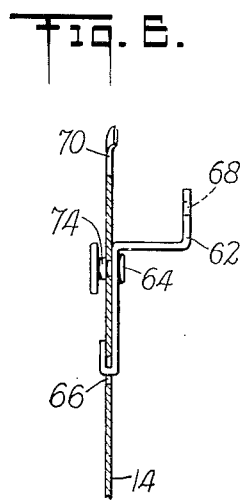
INVENTOR
Hoel L. Bowditch
BY
Blair, Curtis + Hayward
ATTORNEYS Patented Nov. 6, 1951

2,573,950

UNITED STATES PATENT OFFICE 2,573,950

INDICATOR FOR RECORDING INSTRUMENT

Hoel L. Bowditch, Jamaica Plain, Mass., assignor to The Foxboro Company, Foxboro, Mass., a corporation of Massachusetts Application January 9, 1948, Serial No. 1,383

2 Claims. (Cl. 346—17)

This invention relates to indicator-recorders for indicating and recording the value of a variable of a process and more particularly to a long-distance indicator adapted to be incorporated in such a recorder to permit visual determination of the value of the process variable at a considerable distance from the recorder. The indicator of the present invention is particularly adapted to be applied to a widely used type of recorder wherein a pen arm or the like is angularly positioned in accordance with the value of a process variable and cooperates with a rotating chart to make a continuous record of the value of the variable. The indicator will be illustratively described as applied to such a recorder.

In the use of recording instruments of this type, an operator often wishes to read the value of the process variable at a considerable distance from the recorder. However since the graduations on the chart are quite small, they, and sometimes the pen arm as well, are not visible at a distance. Hence with instruments of this type it is necessary for the operator to approach close to the instrument before he can obtain a reading.

It is accordingly an object of the present invention to provide an indicator for a recording instrument that permits the recorded value of a process variable to be accurately read at a considerable distance from the recorder. Since the mechanism for positioning the pen arm of such a recorder may be of low power, it is another object of the invention to provide an indicator that can be satisfactorily operated by a very low power actuating mechanism. It is a further object of the invention to provide an indicator that is easily calibrated. It is a still further object of the invention to provide an indicator that does not interfere with the normal functioning of the recorder, i. e. which does not render more difficult removal or replacement of the chart and which does not undesirably obscure or conceal the record of the process variable. Other objects of the invention will be in part obvious and in part pointed out hereafter.

The many objects and advantages of the present invention may best be appreciated by reference to the accompanying drawings which illustrate apparatus incorporating a preferred embodiment of the invention and wherein:

Figure 1 is a front view of a recording instrument with the present indicator mounted thereon;

Figure 2 is an enlarged front view of the indicator shown in Figure 1;

Figure 3 is a section taken on the line 3—3 of Figure 2 and showing the mechanism for actuating the pointer of the indicator;

Figure 4 is a view similar to Figure 2 but with the scale plate and pointer removed to show the pointer actuating mechanism;

Figure 5 is a substantially vertical section taken on the line 5—5 of Figure 2 and provides a side view of the pointer mounting and actuating mechanism; and Figure 6 is a detail side view of the pen arm.

Referring to the drawings and more particularly to Figures 1 and 2, the numeral 10 designates a recording controller, the internal construction of which may be generally similar to that of the controller disclosed in Mason application, Serial No. 385,493, filed March 27, 1941, Patent No. 2,476,104, dated July 12, 1949. The controller comprises a conventional chart 12 mounted for counterclockwise rotation, and a pen arm 14 angularly positioned in accordance with the value of a process variable, in this case temperature, and adapted to cooperate with the chart 12 to indicate and record the value of the temperature. In order to provide an indication of temperature that may be read at a considerable distance from the controller, there is mounted on the controller a scale plate 16 in the form of an annular sector subtending an angle of about 120°, and a pointer 18 pivotally mounted on the controller and adapted to cooperate with a reference scale 20 on the scale plate 16. The scale plate 16 is mounted in front of the upper half of chart 12 and substantially parallel thereto. Since the chart 12 turns in a counterclockwise direction and the pen 14 is below the lower edge of scale plate 16, the scale plate does not prevent the observation of either the position of the pen or of the major portion of the temperature record. More particularly the scale plate is so positioned with respect to the chart as to expose that portion of the temperature record in which the operator is most likely to be interested, namely, that portion of the record that has been made during a number of hours preceding the time of observation.

The reference scale 20 may, as shown in Figures 1 and 2, have a range corresponding with that of the chart 12, or it may have a larger or smaller range. It is preferably provided with large numbers that are visible at a considerable distance from the instrument.

In the present embodiment the pointer 18 is directly connected to the pen arm 14 and positioned thereby. Moreover the pointer is so constructed and mounted that it is easily movable by the pen arm and does not prevent the pen arm from accurately indicating and recording the value of the process variable. The manner in which the scale plate 16 and pointer 18 are mounted on the instrument is best shown in Figures 3, 4 and 5 of the drawings. These figures of the drawings show a pen mounting which may be generally similar in construction to that shown in my prior application, Serial No. 660,644 filed April 9, 1946, Patent No. 2,455,326, dated November 30, 1948, and which, like my prior structure, includes a pair of posts 22 and 24 on which are mounted a series of supporting plates 26, 28 and 30. Referring particularly to Figure 5, the forward end of a bracket 32 is pivoted on the supporting plate 28 at 34 and is provided with an extension 36 on which the pen arm 14 is mounted. The pen arm is positioned in accordance with the value of temperature by rotation of bracket 32 about pivot 34 by any suitable temperature-responsive means such as, for example, that described in my prior application referred to above.

Referring to Figures 3 and 4, the supporting plate 30 at its lower and outer ends is provided with threaded collars 40 and 42 that are staked to the plate 30 and have the screws 44 and 46 threaded therein respectively. At its upper ends the scale plate 16 is provided with the slotted ears 48 and 50 that engage the screws 44 and 46 respectively in such manner that the scale plate is held against the collars by the screws and thus secured in fixed relation to the instrument. The slots in the ears 48 and 50 provide a means whereby the scale plate 16 may be vertically adjusted to assist in calibrating the reference scale 20.

As best shown in Figure 5, the supporting plate 30 is provided with a forwardly and downwardly extending arm 52 that cooperates with plate 30 to support a spindle 54 which is freely rotatable with respect to the plate and arm. The pointer 18 is fixed to the spindle 54 and provided at its upper end with a counterweight 56 that balances the weight of the lower portion of pointer 18. Thus only a very small force is required to move the pointer. As shown in Figure 2, the pointer 18 extends downwardly over the scale plate 16 and cooperates with the reference scale 20 to indicate the value of the process variable. The pointer is linked to the pen arm 14 in such manner that it is moved by the pen arm to indicate continuously the same temperature value as the pen 14.

Referring to Figure 4, there is fixed to the spindle 54 a downwardly extending lever 58 which is connected by a link 60 to the pen arm 14. The link 60 may suitably be a ball-tip link of the type disclosed in my prior application, Serial No. 660,978 filed April 10, 1946, Patent No. 2,561,969, dated July 24, 1951.

The portion of pen arm 14 that engages link 60 is best shown in Figure 6. The pen arm is provided with a stepped connecting member 62 that is fixed to the pen 14 by a rivet 64, and has a lower end that passes through a hole 66 in the pen arm and is turned back to hold the member 62 securely to the pen arm and prevent swiveling thereof about rivet 64. The upper forward end of member 62 is provided with a hole 68 that engages the link 60, and thus the pen arm 14 is effectively connected through member 62, link 60, lever 58 and spindle 54 with the pointer 18.

The upper end of pen arm 14 (see Figure 4) is provided with a forked end 70 that engages a stud 72 on the extension 36. The lower end of extension 36 is provided with a similarly forked end (not shown) that engages a portion 74 (see Fig. 6) of the shank of rivet 64, and thus the pen arm 14 is detachably secured to the extension 36. Since member 62 may be detached from link 60 in the manner described in my application Serial No. 660,978 referred to above, the pen arm 14 is readily detachable from the instrument for replacement or repairs.

From the foregoing description it should be apparent that the present structure is capable of achieving the various objectives set forth above. The scale plate 16 is so constructed and mounted as to provide a clear indication of the value of the process variable without concealing the record made on the chart 12 until the record is many hours old. The pointer is so mounted and counterbalanced that it may be moved by application of a very small force, and hence may be directly linked to the pen arm and accurately positioned in accordance with the position of the pen arm. The full scale movement of the pen is about 45°, whereas the full scale movement of the pointer is about 120° and thus the pointer scale is spread out to a greater extent than the chart scale, and hence more easily read at a distance. Since the scale plate is positioned entirely above the center of the instrument, the chart may be readily removed and replaced. The slots 48 and 50 in scale plate 16 permit the scale plate to be vertically adjusted with respect to the pointer 18 and assist in calibrating the indicator.

It is of course to be understood that the foregoing description is illustrative and that numerous changes may be made within the scope of the invention. Thus as indicated above the reference scale 20 may have a larger or smaller range than the scale of the chart 12. Also the scale may be calibrated to indicate the deviation of a process variable from a particular control value. The indicator may indicate the value of the same process variable as the chart records, or it may indicate the value of another process variable. For example, in a flow instrument the indicator may indicate liquid level. Other modifications will be apparent to those skilled in the art.

Since many embodiments might be made of the present invention and since many changes might be made in the embodiment disclosed herein, it is to be understood that the foregoing description is to be interpreted as illustrative only and not in a limiting sense.

I claim:

1. In an industrial round-chart recorder having a pen arm pivotally mounted near the top of said recorder for angular movement over the chart between its center and outer edge to record thereon the values being measured, the combination with said recorder of an indicator arm pivotally mounted near the top of said recorder and close to the pivoted mounting of said pen arm to swing over the chart in an arc extending between corresponding points at the edge of the chart, an arcuate scale plate curved about the indicator pivot and depending over and terminating at its opposite ends near the edge of said chart, whereby said scale plate is located completely within the perimeter of said recorder and hence does not increase the space required for mounting said recorder, the lower edge of the scale plate and the lower end of said indicator arm stopping short of the lower edge of said pen arm so that the record made by the pen of said pen arm is visible at the time it is made and thereafter for the greater part of the travel of said chart as it makes a complete revolution, the lower edge of said scale plate being provided with a reference scale corresponding to the chart scale but the length and size of which are materially greater than those of the chart scale, to provide visibility of the reference scale at a distance, and a linkage connecting the pen arm and indicator arm to cause the pen arm to move the indicator to indicate on the reference scale the same value as that recorded by the pen.

2. In an industrial round-chart recorder having a pen arm pivotally mounted near the top of said recorder for angular movement over the chart between its center and outer edge to record thereon the values being measured, the combination with said recorder of an indicator arm pivotally mounted near the top of said recorder and close to the pivoted mounting of said pen arm to swing over the chart in an arc extending between corresponding points at the edge of the chart, an arcuate scale plate curved about the indicator pivot and depending over and terminating at its opposite ends near the edge of said chart, whereby said scale plate is located completely within the perimeter of said recorder and hence does not increase the space required for mounting said recorder, the lower edge of the scale plate and the lower end of said indicator arm stopping short of the lower edge of said pen arm so that the record made by the pen of said pen arm is visible at the time it is made and thereafter for the greater part of the travel of said chart as it makes a complete revolution, the lower edge of said scale plate being provided with a reference scale corresponding to the chart scale but the length and size of which are materially greater than those of the chart scale, to provide visibility of the reference scale at a distance, and a linkage connecting the pen arm and indicator arm to cause the pen arm to move the indicator to indicate on the reference scale the same value as that recorded by the pen, said scale plate being provided at its ends with vertical slots through which it is mounted on said recorder, said slots permitting vertical adjustment of said scale plate with respect to said recorder to vary uniformly the effective radius of said indicator arm and thereby assist in calibration of said reference scale with respect to said indicator.

HOEL L. BOWDITCH.

REFERENCES CITED

The following references are of record in the file of this patent:

UNITED STATES PATENTS

| Number | Name | Date |
|---|---|---|
| 373,719 | Brewster | Nov. 22, 1887 |
| 392,310 | Brewster | Nov. 6, 1888 |
| 571,334 | Brown | Nov. 17, 1896 |
| 677,674 | Manning | July 2, 1901 |
| 785,677 | Manning | Mar. 21, 1905 |
| 976,054 | Lany | Nov. 15, 1910 |
| 2,307,912 | Bean et al. | Jan. 12, 1943 |